(12) United States Patent
Sakai (10) Patent No.: US 7,318,679 B2
(45) Date of Patent: Jan. 15, 2008

(54) DATA PROCESS APPARATUS FOR CONTROLLING COMMUNICATION BY COMMUNICATION UNIT IN ACCORDANCE WITH GENERATED ERROR TYPE, AND METHOD OF CONTROLLING THE SAME

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/169,994

(22) Filed: Jun. 28, 2005

(65) Prior Publication Data

US 2005/0286949 A1    Dec. 29, 2005

(30) Foreign Application Priority Data

Jun. 29, 2004    (JP) ............................. 2004-191627

(51) Int. Cl.
  *B41J 5/30*    (2006.01)
(52) U.S. Cl. .................... 400/62; 400/63; 358/1.14; 358/1.15
(58) Field of Classification Search ............ 400/61–63, 400/70, 76; 358/1.9, 1.14, 1.15
  See application file for complete search history.

(56) References Cited

U.S. PATENT DOCUMENTS

| | | | | |
|---|---|---|---|---|
| 5,550,637 A | * | 8/1996 | Murakami | 358/296 |
| 5,897,252 A | * | 4/1999 | Kanakubo | 400/74 |
| 5,917,610 A | * | 6/1999 | Komada et al. | 358/400 |
| 5,933,581 A | * | 8/1999 | Miyazaki et al. | 358/1.14 |
| 2002/0140963 A1 | * | 10/2002 | Otsuka | 358/1.14 |
| 2003/0197886 A1 | * | 10/2003 | Fujinaga et al. | 358/1.14 |
| 2004/0227970 A1 | * | 11/2004 | Ohara | 358/1.13 |

FOREIGN PATENT DOCUMENTS

| | | | |
|---|---|---|---|
| EP | 1035499 A2 | * | 9/2000 |
| JP | 11-008831 | | 1/1999 |
| JP | 11-194901 | | 7/1999 |
| JP | 2000-339118 | | 12/2000 |
| JP | 2000-339118 A | | 12/2000 |
| JP | 2002356038 A | * | 12/2002 |

OTHER PUBLICATIONS

English Abstract for Japanese Patent Application 11-008831.
English Abstract for Japanese Patent Application 11-194901.
Official Letter and Search Report of Korean Patent Office dated Nov. 17, 2006.
Apr. 6, 2007 First Office Action from China Patent Office for counterpart application, Application No. 200510080906X filed on Mar. 20, 2007 (Chinese Language).

* cited by examiner

*Primary Examiner*—Minh Chau
(74) *Attorney, Agent, or Firm*—Morgan & Finnegan LLP (57) ABSTRACT

To flexibly control a communication status between devices, in accordance with an error type generated in a data process device such as a printing device. Also, to improve a communication efficiency or attain a low power consumption. A type of an error generated in the data process device, such as the printing device, is discriminated by the data process unit such as the printing device or an imaging device. In accordance with the discriminated error type, the communication with a partner device is transited to the low power consumption mode, or the communication with the partner device is disconnected.

22 Claims, 7 Drawing Sheets

| ERROR REASON | ERROR STATUS |
|---|---|
| PAPER EMPTY | WARNING |
| PAPER JAM | WARNING |
| INK EMPTY | FATAL ERROR |
| FATAL ERROR | FATAL ERROR |
| . . . | . . . |

FIG. 6

| DATA NAME | DATA |
|---|---|
| PRINTER STATUS | PAUSE |
| ERROR STATUS | WARNING |
| ERROR REASON | PAPER EMPTY |

DATA PROCESS APPARATUS FOR CONTROLLING COMMUNICATION BY COMMUNICATION UNIT IN ACCORDANCE WITH GENERATED ERROR TYPE, AND METHOD OF CONTROLLING THE SAME

BACKGROUND OF THE INVENTION

1. Field of the Invention

The present invention relates to a data process apparatus for controlling communication by a communication unit in accordance with a generated error type, and a method of controlling the same.

2. Related Background Art

There is a direct print method of directly transferring a taken image from an imaging device to a printing device for printing (for example, Japanese Patent Application Laid-open No. H11-008831). In this method, a standard rule is defined in accordance with CAMERA & IMAGING PRODUCTS ASSOCIATION (CIPA). In the case of the imaging device and printing device according to this standard rule, transfer and printing can be executed directly between the imaging device and the printing device through the mutual connection, independently of manufacturers and models of the imaging device and the printing device.

In the process of the direct printing, the printing device repeats the process for receiving the data of only the quantity that can be received at one time, and carrying out the printing process while maintaining a communication link for data transfer, and then sequentially receiving the data corresponding to a buffer amount that becomes free after the printing process from the imaging device. Here, if an error, such as jam, paper-out or ink-out, is generated during the printing process in a printing mechanism of the printing device, a suitable process must be performed to cope with the error even in the communication unit maintaining the communication link. Conventionally, when such an error is generated, the control method of the communication unit waits for the recovery of the error while maintaining the connection between the printing device and the imaging device.

However, in the conventional method, it could not be said that flexible communication control based on the error status of the printing device was carried out when the error was generated in the printing device. For example, there is a problem in that unnecessary power is wastefully consumed because the communication is maintained even during the error recovering operation where the communication is not executed. Also, in order to eliminate the waste of power consumption, if the communication is disconnected when the error is generated in the printing device, the error recovery cannot be notified to the imaging device. Thus, there are problems in that a user itself must discriminate whether recovery of the error is attained, a connection operation must be again executed at a time of printing restart, etc. This leads to other problems in that it takes a time to restart the printing and the user needs to execute a troublesome operation in order to restart the printing.

The foregoing problems are generated in the communications between the various devices, not only between the imaging device and the printing device, but also between the imaging device and a personal computer, between the imaging device and a storage device such as a hard disc device between the personal computer and the printing device, and the like.

SUMMARY OF THE INVENTION

An object of the present invention is to flexibly control a communication status between apparatuses in accordance with a generated error type.

Another object of the present invention is to improve a communication efficiency when an error is generated and reduce a power consumption.

Other objects of the present invention will be evident from the following specification and drawings.

DESCRIPTION OF THE PREFERRED EMBODIMENTS

The best mode for carrying out the present invention will be described below with reference to the drawings.

(First Embodiment)

Figure 1:
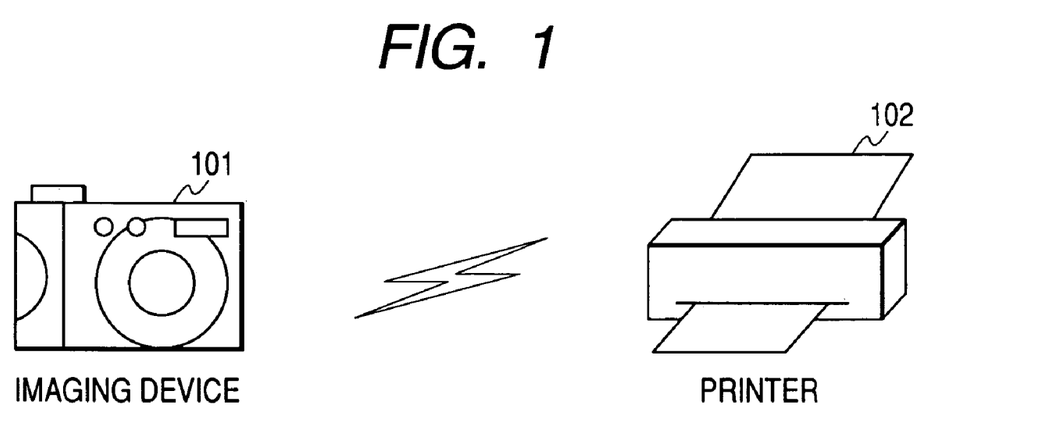
FIG. 1 shows an example according to an embodiment of the present invention.

FIG. 1 shows an imaging device 101 and a printing device 102 according to an embodiment of the present invention.

In this embodiment, the imaging device 101 uses a wireless communication method based on Bluetooth communication to transfer a print request to the printing device (printer) 102. The printing device 102 obtains, in response to the print request received from the imaging device 101, the image data specified in the print request from the imaging device 101 and carries out the printing.

Also, in this embodiment, the Bluetooth of the wireless communication method is used as the wireless communication. However, the applicable facts even in wireless LAN, such as IEEE802. 11$a/b/g/h/e$, Ultra Wide Band (UWB) and other wireless communications are noted here.

Figure 2:
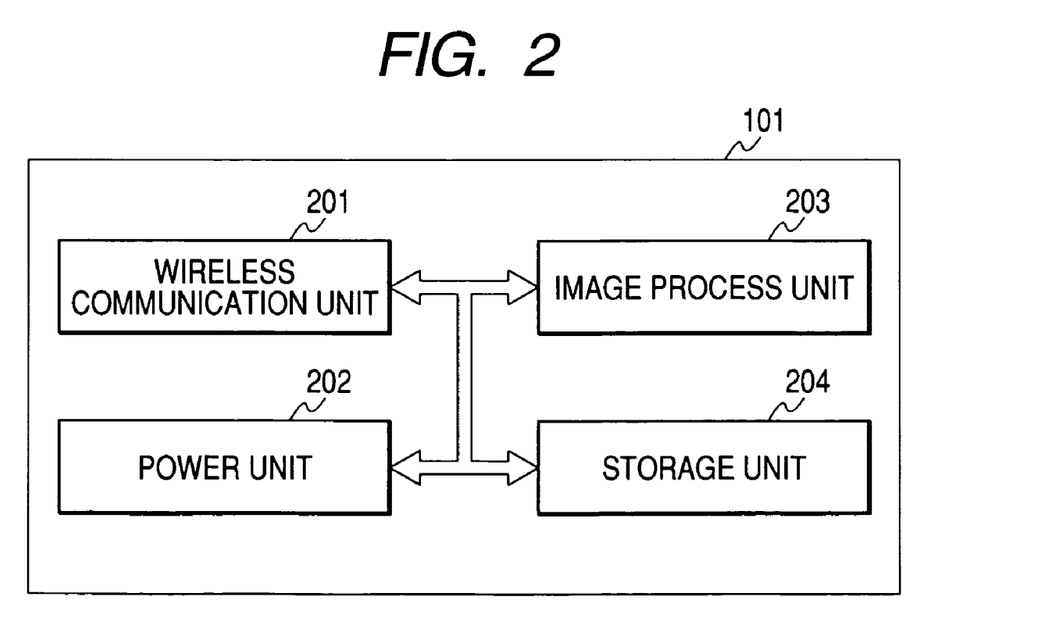
FIG. 2 is a construction view of a function block of an imaging device according to a first embodiment.

The construction of the imaging device 101 of this embodiment will be described by using the function block diagram shown in FIG. 2.

The imaging device 101 includes at least a wireless communication unit 201, a power unit 202, an image process unit 203 and a storage unit 204.

In the wireless communication unit 201, the imaging device 101 has a function for carrying out a wireless communication with a peripheral terminal.

The power unit 202 supplies predetermined voltages and currents to the respective units of the imaging device 101.

The image process unit 203 has a function for carrying out an imaging process that is the main function of the imaging device 101.

The storage unit 204 has a function for storing a program required to control the imaging device 101 and storing data such as an image taken by an image process unit 203, and is constituted by a storage medium such as a memory or a card.

Figure 3:
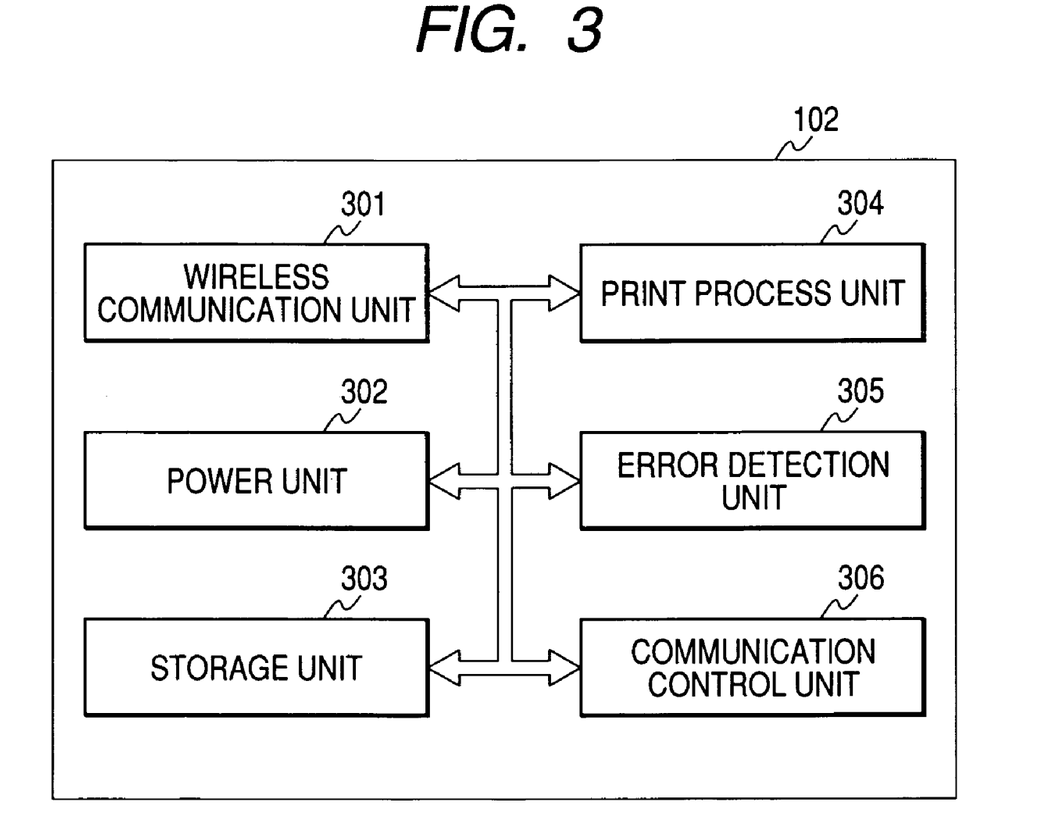
FIG. 3 is a construction view of a function block of a printer according to the first embodiment.

The construction of the printing device 102 of this embodiment will be described below by using a function block diagram shown in FIG. 3.

The printing device 102 includes at least a wireless communication unit 301, a power unit 302, a storage unit 303, a print process unit 304, an error detection unit 305 and a communication control unit 306.

In the wireless communication unit 301, the printing device 102 has a function for carrying out a wireless communication with a peripheral terminal.

The power unit 302 supplies predetermined voltages and currents to the respective units of the printing device 102.

The storage unit 303 has a function for storing a program required to control the printing device 102, data transferred by the imaging device 101 and the like, and is constituted by a storage medium such as a memory, a card or a hard disc drive.

The print process unit 304 has a function for carrying out a print process, which is the main function of the printing device 102.

The error detection unit 305 has: a function for detecting an error generated in the printer, actuating the communication control unit 306, and notifying the type of the generated error to the communication control unit 306; and a function for notifying the error through the wireless communication unit 301 to the imaging device 101.

The communication control unit 306 has a function for controlling the communication status with the imaging device 101 and carries out a process for transiting the communication status to a low power consumption mode in accordance with the type of the generated printer error or disconnecting the connection. Moreover, the communication control unit has a function for returning the communication status to the status prior to the error generation and restarting the data transfer, when the communication status is the low power consumption mode at the time of the error recovery.

Figure 4:
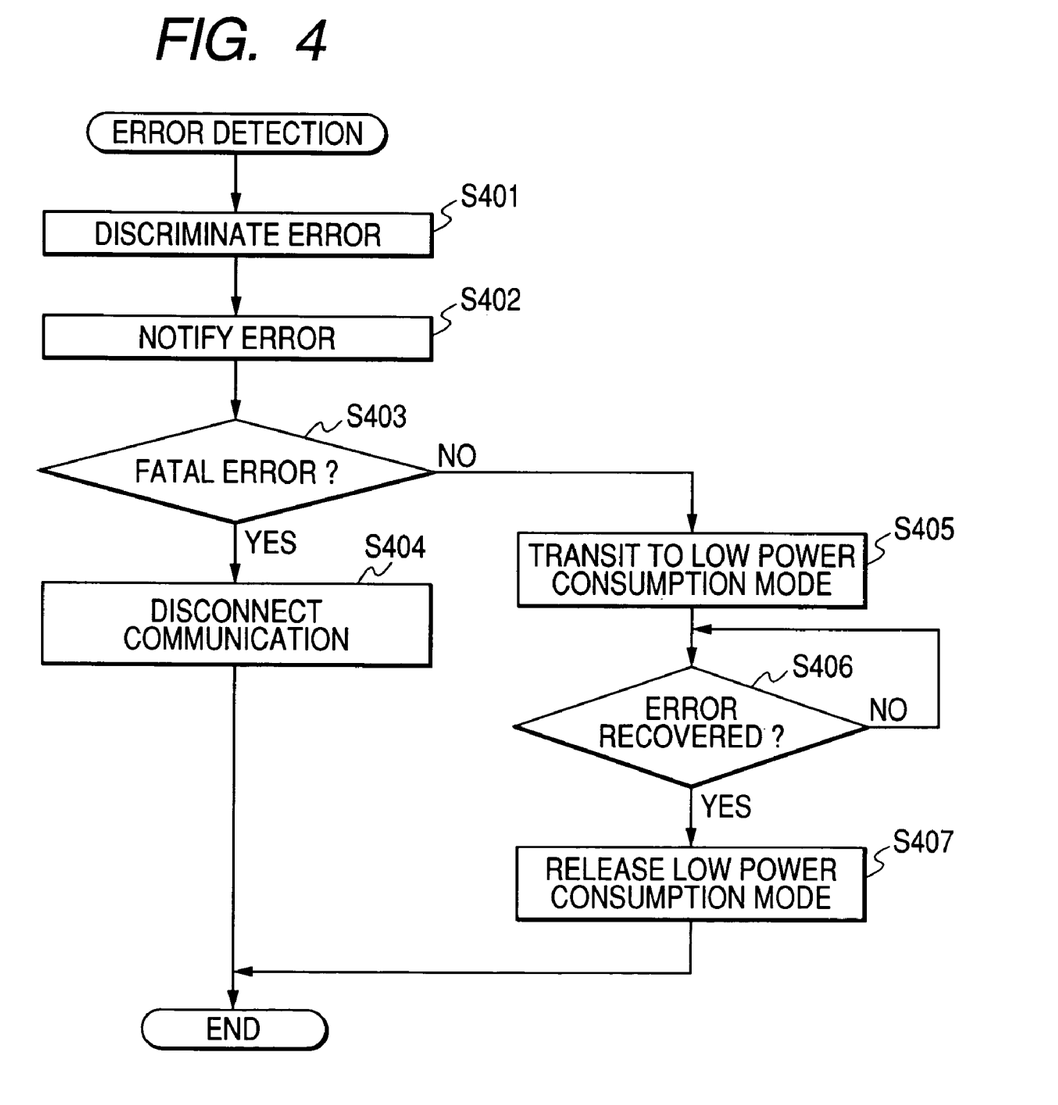
FIG. 4 is a flowchart showing a process procedure of a control unit in the printer.

The process procedure when the printing device 102 detects the error will be described below by using a flowchart shown in FIG. 4.

Figure 5:
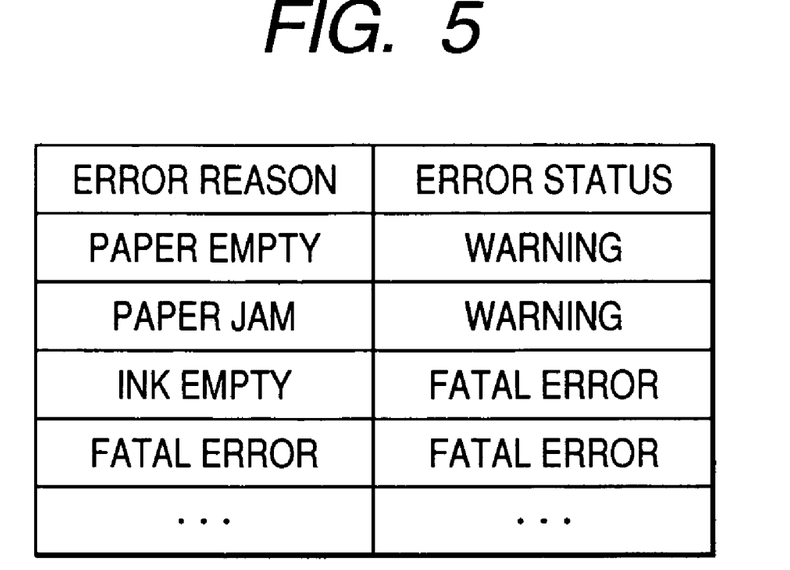
FIG. 5 shows an example in an error discrimination table.

At a step S401, the communication control unit 306 discriminates the error by referring to an error discrimination table stored in the storage unit 303, on the basis of error information notified by the error detection unit 305. FIG. 5 shows an example of the error discrimination table. As shown in FIG. 5, each error is classified into: [Warning] implying the error where a recovery is possible while a communication is maintained; and [Fatal Error] implying the error where the recovery is difficult if the communication is maintained.

Figure 6:
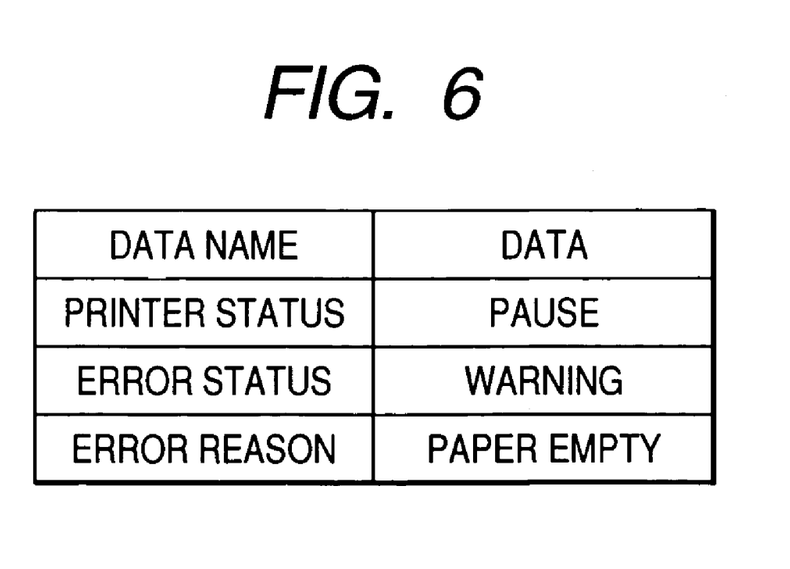
FIG. 6 shows an example in a data in a status notice.

At a step S402, the communication control unit 306 transmits a status notice including the information with regard to the generated error, such as an error reason and an error status, through the wireless communication unit 301 to the imaging device 101. FIG. 6 shows an example of data in the status notice. As shown in FIG. 6, the status notice includes at least the information of [Printer status ([Pause] indicating suspension or [Printing] indicating print execution)], [Error status] and [Error Reason].

At a step S403, the communication control unit 306 examines whether or not the error status obtained by referring to the error discrimination table at the step S401 is [Fatal Error].

At a step S403, when the error status is [Fatal Error], at a step S404, the communication control unit 306 instructs the wireless communication unit 301 to finish the communication with the imaging device 101. Then, the wireless communication unit 301 finishes the communication with the imaging device 101.

At the step S403, when the error status is [Warning], at a step S405, the communication control unit 306 instructs the wireless communication unit 301 to change the communication status with the imaging device 101 to the low power consumption mode. In this embodiment, suppose that a park mode is indicated as the low power consumption mode of Bluetooth. The wireless communication unit 301 transmits a park mode request to the imaging device 101. Then, on reception of a message agreeing to the park mode request from a wireless communication unit 201 of the imaging device 101, the communication between the imaging device 101 and the printing device 102 is interrupted to transit to the park mode. Here, the unit that transits to the park mode may be the wireless communication unit 301 of the printing device 102 or may be the wireless communication unit 201 of the imaging device 101. However, since the imaging device 101 is operated by a battery in many cases, the wireless communication unit 201 of the imaging device 101 may be preferably transited to the park mode. In this case, when the communication between the imaging device 101 and the printing device 102 is started, whether or not the battery operation is being executed is notified to each other. When the imaging device 101 is being operated by the battery, the printing device 102 transits the wireless communication unit 201 of the imaging device 101 to the park mode. Also, when both of them are not operated by the battery, the transition to the park mode may not be executed. Also, both of a wireless communication unit 801 of the printing device 102 and a wireless communication unit 701 of the imaging device 101 may be transited to the low power consumption mode.

At a step S406, the communication control unit 306 monitors the status of the printer and waits for the recovery of the printer error.

At a step S407, when the printer error is corrected and the communication control unit 306 recognizes the recovery from the printer error, the communication control unit 306 instructs the wireless communication unit 301 to release the park mode. The wireless communication unit 301 transmits a park mode release request to the imaging device 101. On reception of a message agreeing to the park mode release from the wireless communication unit 201 of the imaging device 101, the park mode is released.

After the release of the park mode, the imaging device 101 and the printing device 102 restart the interrupted data transfer.

With the above-mentioned procedure, the control of the communication status is carried out when the printer error is generated during the printing.

According to the first embodiment as mentioned above, the wireless communication between the imaging device and the printing device is preferably controlled on the, basis of the error status and type of the printing device. Concretely, when the error that may be easily recovered is generated such as the paper-out or the jam, the wireless communication is set in the low power consumption mode. When the error whose recovery requires a long time, such as the ink-out or the error requiring the re-start is generated, the wireless communication is disconnected. Consequently, the wasteful power consumption can be avoided. Also, in the case of the low power consumption mode, the printing can be quickly restarted without any imposition of the complex operation on the user. Thus, the communication efficiency at the time of the error generation can be improved.

(Second Embodiment)

The first embodiment relates to the method in which when the error is generated in the printing device 102, the printing device 102 takes the lead and controls the status of the wireless communication between the imaging device 101 and the printing device 102, on the basis of the error status.

By the way, the direct print method is assumed to be carried out between the various combinations of the printing device and the imaging device, independently of manufacturers and devices. For this reason, it may be considered that the control described in the first embodiment cannot be executed by the printing device.

So, in the second embodiment, when the error is generated in the printing device 102, on the basis of the error status information notified by the printing device 102, the imaging device 101 takes the lead and controls the status of the wireless communication between the imaging device 101 and the printing device 102. Consequently, even when the status of the wireless communication cannot be controlled under the lead of the printing device as in the first embodiment, the control is carried out under the lead of the imaging device 101. Thus, the effect similar to that of the first embodiment can be obtained.

Figure 7:
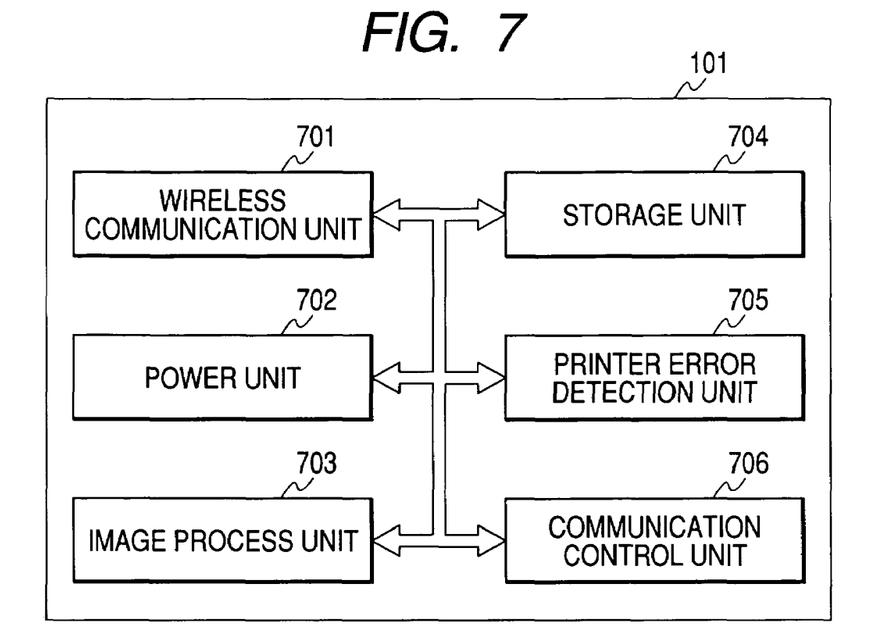
FIG. 7 is a construction view of a function block of an imaging device according to a second embodiment.

The construction of the imaging device 101 in this embodiment will be described below by using the function block diagram shown in FIG. 7.

The imaging device 101 includes at least a wireless communication unit 701, a power unit 702, an image process unit 703, a storage unit 704, a printer error detection unit 705 and a communication control unit 706.

In the wireless communication unit 701, the imaging device 101 has a function for carrying out a wireless communication with a peripheral terminal.

The power unit 702 supplies predetermined voltages and currents to the respective units of the imaging device 101.

The image process unit 703 has a function for carrying out an imaging process that is the main function of the imaging device 101.

The storage unit 704 has a function for storing a program required to control the imaging device 101 and storing data such as an image taken by an image process unit 203, and is constituted by a storage medium such as a memory, a card or a hard disc drive. Also, in this embodiment, the storage unit 704 stores the error discrimination table as shown in FIG. 5.

The printer error detection unit 705 has a function for detecting the printer error generation and error type from the error notice transferred by the printing device 102, starting the communication control unit 706, and notifying the type of the generated error to the communication control unit 706.

The communication control unit 706 has a function for controlling the communication status with the printing device 102 and carries out a process for transiting the communication status to the low power consumption mode in accordance with the type of the generated printer error or disconnecting the connection. Moreover, the communication control unit has a function for returning the communication status to the status prior to the error generation and restarting the data transfer when the communication status is the low power consumption mode at the time of the error recovery.

Figure 8:
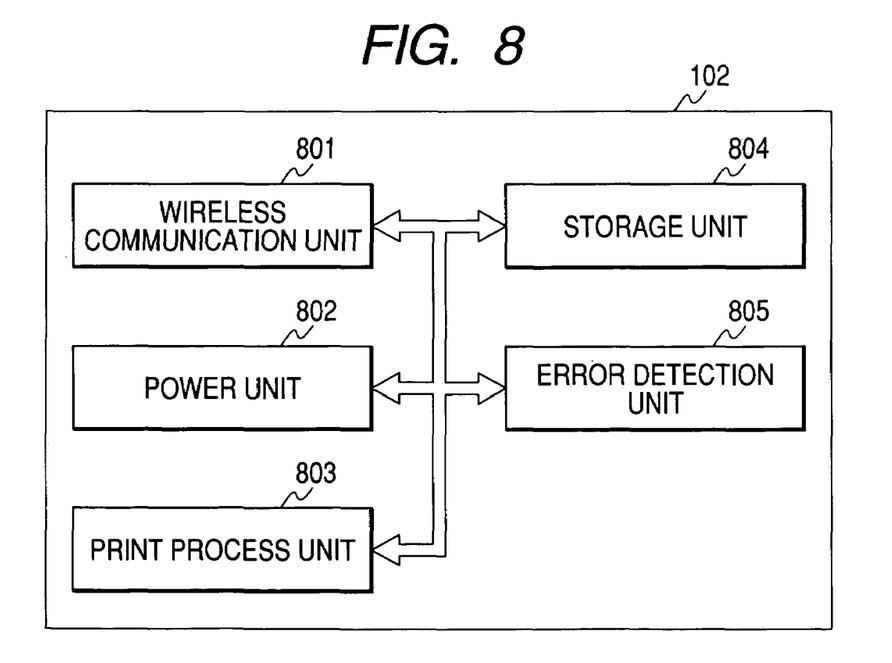
FIG. 8 is a construction view of a function block of a printer according to the second embodiment.

The construction of the printing device 102 of this embodiment will be described below by using a function block diagram shown in FIG. 8.

The printing device 102 at least includes a wireless communication unit 801, a power unit 802, a storage unit 803, a print process unit 804 and an error detection unit 805.

In the wireless communication unit 801, the printing device 102 has a function for carrying out a wireless communication with a peripheral terminal.

The power unit 802 supplies predetermined voltages and currents to the respective units of the printing device 102.

The storage unit 803 has a function for storing a program required to control the printing device 102, data transferred by the imaging device 101 and the like, and is constituted by a storage medium such as a memory, a card or a hard disc drive.

The print process unit 804 has a function for carrying out a print process, which is the main function of the printing device 102. The error detection unit 805 has a function for detecting the error generated in the printer and notifying the error through a wireless communication unit 801 to the imaging device 101.

The process procedure when the error is generated in the printing device 102 during the print process and then the error detection unit 805 of the printing device 102 notifies the imaging device 101 of the error status through the wireless communication unit 801 will be described below by using FIGS. 9 and 10.

Figure 9:
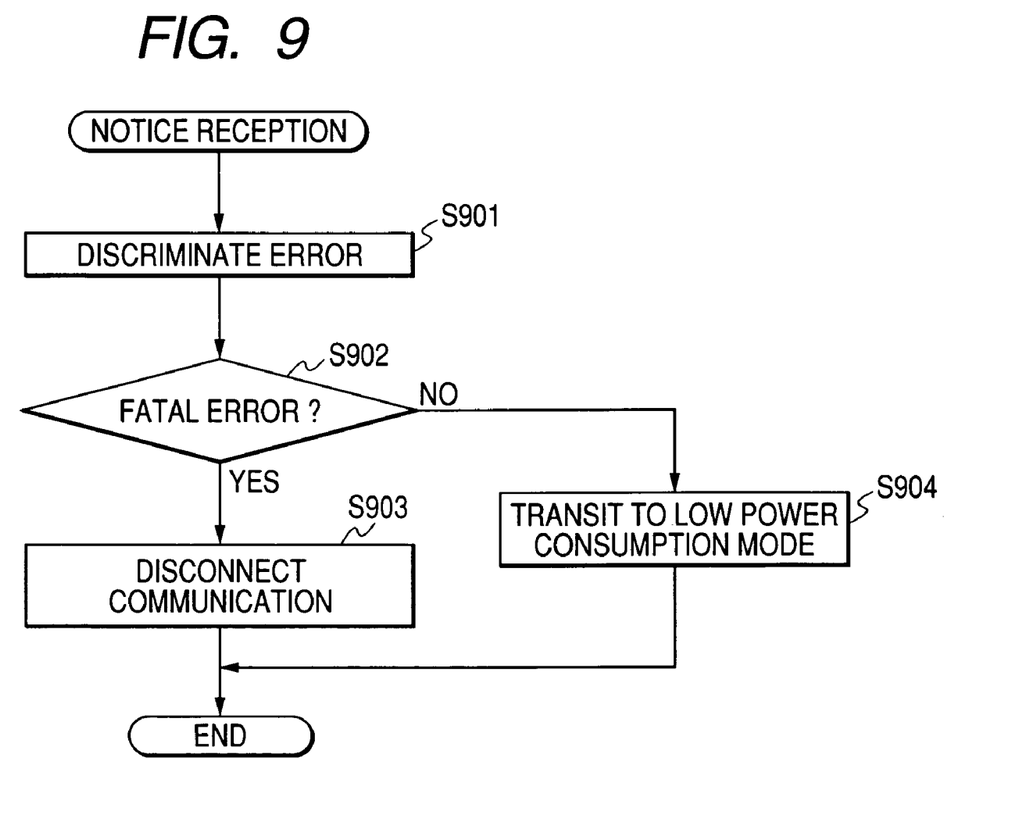
FIG. 9 is a flowchart showing a process procedure of a control unit in the imaging device.
Figure 10:
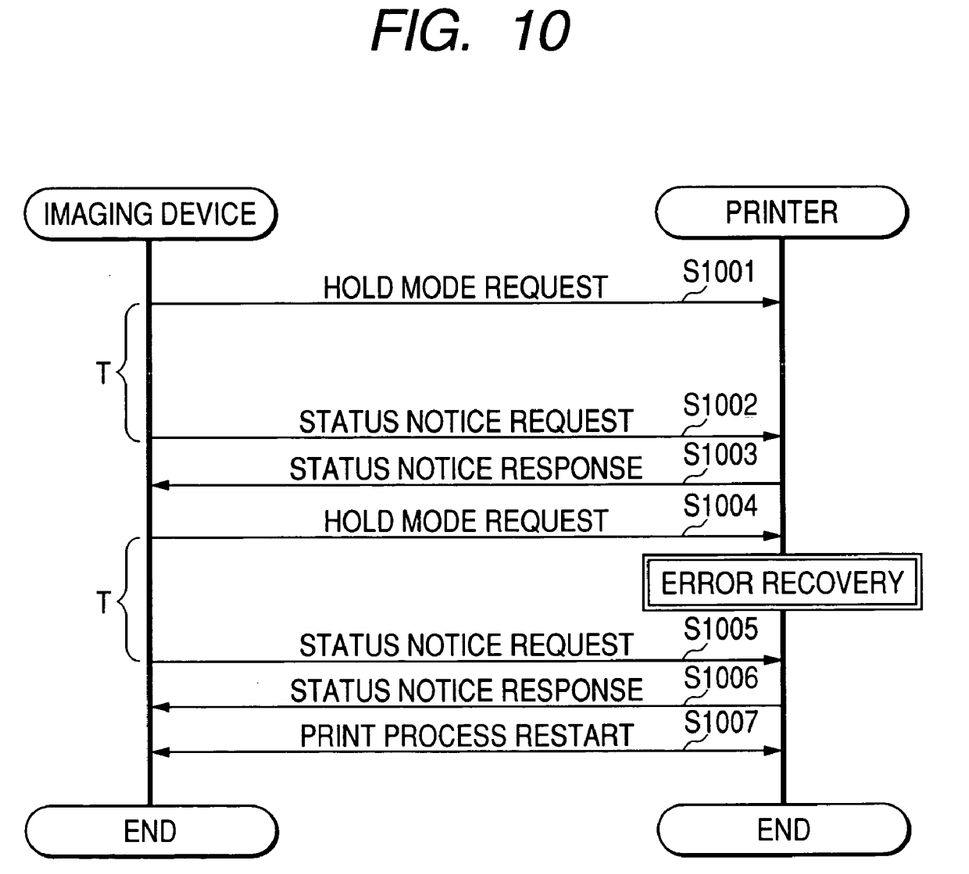
FIG. 10 is an operation explanation view of a communication control mainly executed by the imaging device in the second embodiment.

FIG. 9 is a flowchart showing the process procedure of the communication control unit 706 until the transition to the low power consumption mode after the error notice reception.

The printing device 102, when the error is detected by the error detection unit 805 during the print process, notifies the imaging device 101 of the error and the type of the generated error. Here, the type of the error notified by the printing device 102 is the information corresponding to the error reason in FIG. 5.

At a step S901, the error detection unit 705 refers to the error status in the message notified by the imaging device 101 and notifies the communication control unit 706 of the status of the printer error obtained therein.

At a step S902, the communication control unit 706 examines whether or not the error status obtained at the step S901 is [Fatal Error], by referring to the error discrimination table (FIG. 5) stored in the storage unit 704.

At the step S902, when the error status is [Fatal Error], at a step S903, the communication control unit 706 instructs the wireless communication unit 701 to finish the communication with the printing device 102. Then, the wireless communication unit 701 finishes the communication with the printing device 102.

At the step S902, when the error status is [Warning], at a step S904, the communication control unit 706 instructs the wireless communication unit 701 to change the communication status with the printing device 102 to a low power consumption mode. In this embodiment, suppose that a hold mode is indicated as the low power consumption mode of Bluetooth. The wireless communication unit 701 transmits a hold mode request to the printing device 102. Then, on reception of a message agreeing to the hold mode request from a wireless communication unit 801, the communication between the imaging device 101 and the printing device 102 is interrupted to transit to the hold mode. Here, the unit that transits to the hold mode may be the wireless communication unit 801 of the printing device 102 or may be the wireless communication unit 701 of the imaging device 101. However, since the imaging device 101 is operated by a battery in many cases, the wireless communication unit 701 of the imaging device 101 may be preferably transited to the hold mode. In this case, when the communication between the imaging device 101 and the printing device 102 is started, whether or not the battery operation is being executed is notified to each other. When the imaging device 101 is being operated by the battery, the printing device 102 transits the wireless communication unit 701 of the imaging device 101 to the hold mode. Also, when both of them are not operated by the battery, the transition to the hold mode may not be executed. Also, both of a wireless communication unit 801 of the printing device 102 and a wireless communication unit 701 of the imaging device 101 may be transited to the low power consumption mode.

The process procedure of the communication control unit 706 in the case of releasing the hold mode during the hold mode and after the error recovery will be described below by using the operation explanation view shown in FIG. 10.

At a step S1001, in accordance with the instruction of the communication control unit 706, the wireless communication unit 701 transmits a hold mode request to the printing device 102, and the communication between the imaging device 101 and the printing device 102 is transited to the hold mode. Here, in the process illustrated in the flowchart of FIG. 9 as mentioned above, the hold mode request is received in advance by the printing device 102. Thus, without any reception of a hold mode agreement message from the printing device 102, it is transited to the hold mode.

A hold mode continuation time (defined as a time T in this embodiment) is described in the hold mode request. Then, the wireless communication units 701 and 801 of the imaging device 101 and the printing device 102 release the hold mode at the elapse of the time T after the transition to the hold mode and return back to the status where the normal communication can be executed.

At a step S1002, at the elapse of the time T after the transition to the hold mode, the communication control unit 706 transmits a status notice request to obtain the status of the printing device 102, through the wireless communication unit 701 to the printing device 102.

At a step S1003, as the response of the status notice request of the step S1002, the printing device 102 transmits: the status data as to whether the error is recovered or continuous; and the type of the continuous error, as a status notice response message to the imaging device 101. Note that, when the printer 101 has the table shown in FIG. 6, the status notice response message including the status information shown in FIG. 6 is transmitted to the imaging device 101. In this case, in the status notice response message at this step of FIG. 10, the device is not still recovered from the error. Thus, [Pause] is stored in the printer status information.

At a step S1004, the communication control unit 706 refers to the printer status information in the received status notice response message, and since the printer status is [Pause], discriminates that the device is not still recovered from the printer error. Then, the communication control unit again transmits the hold mode request to the printing device 102 and transits to the hold mode.

At steps S1005 and S1006, when the error recovery is carried out in the previous hold mode, the communication control unit 706 refers to the printer status information by using the procedure similar to the steps 1002 and 1003, and since the printer status is [Printing], discriminates that the printing device 102 is recovered from the error, and restarts the interrupted data transfer.

With the above-mentioned procedure, the control of the communication status is carried out when the printer error is generated during the printing.

As mentioned above, according to the second embodiment, in addition to the effect of the first embodiment, even when the printer does not have any function for carrying out the control of the wireless communication as in the first embodiment, wasteful power consumption can be avoided. Also, without any imposition of the complex operation on the user, the printing can be quickly restarted, which can also improve the communication efficiency at the time of the error generation.

In the explanations of the respective embodiments, the communication between the imaging device and the printing device has been explained. However, the present invention can be also applied to communications between the various devices, such as communication between the imaging device and the personal computer, communication between the imaging device and the storage device such as the hard disc device, and communication between the personal computer and the printing device.

According to the present invention, the communication status between the devices can be softly controlled in accordance with the error type of the data process device. Also, the communication efficiency when the error is generated can be improved.

Also, the low power consumption when the error is generated can be attained.

This application claims priority from Japanese Patent Application No. 2004-191627 filed Jun. 29, 2004, which is hereby incorporated by reference herein.

What is claimed is:

1. A data process apparatus that communicates data by a communication unit, comprising:
   a discrimination device configured to discriminate an error type generated in the data process apparatus or a communication partner apparatus; and
   a selection device configured to execute selectively a process for setting a communication unit of the partner apparatus in a low power consumption communication mode, and a process for disconnecting the communication with the partner apparatus by the communication unit, in accordance with the discrimination by the discrimination device.

2. A data process apparatus according to claim 1, wherein the discrimination device discriminates whether the generated error is a first type error that can be recovered after a process of reception data is interrupted, or a second type error that cannot be recovered unless the process of the reception data is finished.

3. A data process apparatus according to claim 2, wherein the selection device, when the discrimination device discriminates that the generated error is the first type error, executes the process for setting the communication unit of the partner apparatus in a low power consumption communication mode, and when it is discriminated to be the second type error, the process for disconnecting the communication by the communication unit with the partner apparatus.

4. A data process apparatus according to claim 1, wherein the selection device executes the process, in accordance with whether the data process apparatus or the partner apparatus is being operated by a battery.

5. A data process apparatus according to claim 1, wherein the data process apparatus is a printing apparatus, and the discrimination device discriminates an error type generated during a print process.

6. A data process apparatus according to claim 5, wherein when the discrimination device discriminates a paper-out or jam, the selection device executes a process for setting the communication unit of the partner apparatus in the low power consumption communication mode.

7. A data process apparatus according to claim 5, wherein when the discrimination device discriminates recording material out, the selection device executes the process for disconnecting the communication by the communication unit with the partner apparatus.

8. A data process apparatus according to claim 1, wherein the discrimination device discriminates an error type generated in the communication partner apparatus, in accordance with information notified from the communication partner apparatus.

9. A data process apparatus according to claim 1, wherein the communication partner apparatus is a printing apparatus, and the discrimination device discriminates an error type generated during a print process in the printing apparatus.

10. A method of controlling a data process apparatus that communicates data by a communication unit, comprising:
 a discriminating step of discriminating an error type generated in the data process apparatus or a communication partner apparatus, and
 a selecting step of executing selectively a process for setting a communication unit of the partner apparatus in a low power consumption communication mode, and a process for disconnecting the communication with the partner apparatus by the communication unit, in accordance with the discrimination in the discriminating step.

11. A computer readable storage medium which stores a program instruction for controlling a data process apparatus that communicates data by a communication unit, comprising:
 a discriminating step of discriminating an error type generated in the data process apparatus or a communication partner apparatus; and
 a selecting step of executing selectively a process for setting a communication unit of the partner apparatus in a low power consumption mode, and a process for disconnecting the communication with the partner apparatus by the communication unit, in accordance with the discrimination in the discriminating step.

12. A data process apparatus that communicates data by a communication unit, comprising:
 a discrimination device configured to discriminate an error type generated in the data process apparatus or a communication partner apparatus; and
 a selection device configured to execute selectively a process for setting the communication by the communication unit in a low power consumption communication mode, and a process for disconnecting the communication with the partner apparatus by the communication unit, in accordance with the discrimination by the discrimination device,
 wherein the selection device executes the process, in accordance with whether the data process apparatus or the partner apparatus is being operated by a battery.

13. A method of controlling a data process apparatus that communicates data by a communication unit, comprising:
 a discriminating step of discriminating an error type generated in the data process apparatus or a communication partner apparatus; and
 a selecting step of executing selectively a process for setting the communication by the communication unit in a low power consumption communication mode, and a process for disconnecting the communication with the partner apparatus by the communication unit, in accordance with the discrimination in the discriminating step,
 wherein the selecting step executes the process, in accordance with whether the data process apparatus or the partner apparatus is being operated by a battery.

14. A computer readable storage medium which stores a program instruction for controlling a data process apparatus that communicates data by a communication unit, said program comprising:
 a discriminating step of discriminating an error type generated in the data process apparatus or a communication partner apparatus; and
 a selecting step of executing selectively a process for setting the communication by the communication unit in a low power consumption communication mode, and a process for disconnecting the communication with the partner apparatus by the communication unit, in accordance with the discrimination in the discriminating step,
 wherein the selecting step executes the process, in accordance with whether the data process apparatus or the partner apparatus is being operated by a battery.

15. A data process apparatus that communicates data by a communication unit, comprising:
 a discrimination device configured to discriminate an error type generated in a communication partner apparatus in accordance with information notified from the communication partner apparatus; and
 a selection device configured to execute selectively a process for setting the communication by the communication unit in a low power consumption communication mode, and a process for disconnecting the communication with the partner apparatus by the communication unit, in accordance with the discrimination by the discrimination device.

16. A data process apparatus according to claim 15, wherein the discrimination device discriminates whether the generated error is a first type error that can be recovered after a process of reception data is interrupted, or a second type error that cannot be recovered unless the process of the reception data is finished.

17. A data process apparatus according to claim 15, wherein the selection device executes selectively one of a process for setting the communication unit in the low power consumption communication mode, and a process for disconnecting the communication by the communication unit with the partner apparatus, in accordance with the discrimination of the discrimination device.

18. A data process apparatus according to claim 15, wherein the selection device executes selectively one of a process for setting a communication unit of the partner apparatus in the low power consumption communication mode, and a process for disconnecting the communication by the communication unit with the partner apparatus, in accordance with the discrimination by the discrimination device.

19. A data process apparatus according to claim 15, wherein the selection device executes the process, in accordance with whether the data process apparatus or the partner apparatus is being operated by a battery.

20. A data process apparatus according to claim 15, wherein the communication partner apparatus is a printing apparatus, and the discrimination device discriminates an error type generated during a print process in the printing apparatus.

21. A method of controlling a data process apparatus that communicates data by a communication unit, comprising:
   a discriminating step of discriminating an error type generated in a communication partner apparatus in accordance with information notified from the communication partner apparatus; and
   a selecting step of executing selectively a process for setting the communication by the communication unit in a low power consumption communication mode, and a process for disconnecting the communication with the partner apparatus by the communication unit, in accordance with the discrimination in the discriminating step.

22. A computer readable storage medium which stores a program instruction for controlling a data process apparatus that communicates data by a communication unit, said program comprising:
   a discriminating step of discriminating an error type generated in a communication partner apparatus in accordance with information notified from the communication partner apparatus; and
   a selecting step of executing selectively a process for setting the communication by the communication unit in a low power consumption communication mode, and a process for disconnecting the communication with the partner apparatus by the communication unit, in accordance with the discrimination in the discriminating step.

* * * * *